(12) United States Patent
Wada

(10) Patent No.: US 8,220,008 B2
(45) Date of Patent: Jul. 10, 2012

(54) DISK APPARATUS WITH RESILIENT MEMBER ON CAM MECHANISM CONNECTING A MAIN SLIDER TO A SUB-SLIDER

(75) Inventor: Shinichi Wada, Ehime (JP)

(73) Assignee: Panasonic Corporation, Osaka (JP)

( * ) Notice: Subject to any disclaimer, the term of this patent is extended or adjusted under 35 U.S.C. 154(b) by 1008 days.

(21) Appl. No.: 11/916,516

(22) PCT Filed: Jan. 19, 2007

(86) PCT No.: PCT/JP2007/050827
§ 371 (c)(1),
(2), (4) Date: May 7, 2008

(87) PCT Pub. No.: WO2007/088741
PCT Pub. Date: Aug. 9, 2007

(65) Prior Publication Data
US 2009/0044210 A1 Feb. 12, 2009

(30) Foreign Application Priority Data

Feb. 3, 2006 (JP) ................................. 2006-026565

(51) Int. Cl.
*G11B 17/051* (2006.01)
*G11B 7/085* (2006.01)
*G11B 15/60* (2006.01)

(52) U.S. Cl. .................... 720/619; 720/623; 720/690

(58) Field of Classification Search ............... 720/694, 720/692, 690, 623, 619, 633, 638, 693
See application file for complete search history.

(56) References Cited

U.S. PATENT DOCUMENTS

| 6,556,383 | B2 * | 4/2003 | Murphy et al. | 360/244.9 |
| 6,859,935 | B2 * | 2/2005 | Kume | 720/694 |
| 7,739,704 | B2 | 6/2010 | Wada | |
| 2003/0076773 | A1 * | 4/2003 | Moriyama et al. | 369/263 |
| 2004/0205798 | A1 * | 10/2004 | Azai | 720/700 |
| 2006/0168600 | A1 * | 7/2006 | Park et al. | 720/611 |

FOREIGN PATENT DOCUMENTS

| JP | 2-80387 | | 6/1990 |
| JP | 2-80387 U | * | 6/1990 |
| JP | 2000-149532 | | 5/2000 |
| JP | 2002-352498 | | 12/2002 |
| JP | 2006-73140 | | 3/2006 |

OTHER PUBLICATIONS

International Search Report dated Apr. 26, 2007.

* cited by examiner

*Primary Examiner* — Julie Anne Watko
(74) *Attorney, Agent, or Firm* — Dickinson Wright PLLC

(57) ABSTRACT

A slot-in type disk apparatus configured to prevent fine traverse base vibration at disk playback. A base body and a lid constitute a chassis outer sheath having a front surface formed with a disk insertion slot. The base body has a traverse base with a spindle motor, a pickup and a driving unit moving the pickup. A cam displaces the traverse base between the base body and the lid. The cam is provided on each of a main slider and a sub-slider. The main slider and the sub-slider are located sideways of the spindle motor and are connected to each other through a cam lever which is moved by the main slider, and the traverse base is displaced by moving the sub-slider. The cam lever has a resilient member which abuts against the traverse base at the time of playback of a disk.

4 Claims, 4 Drawing Sheets

DISK APPARATUS WITH RESILIENT MEMBER ON CAM MECHANISM CONNECTING A MAIN SLIDER TO A SUB-SLIDER

TECHNICAL FIELD

The present invention relates to a disk apparatus for recording or replaying into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body. According to such a loading method, however, since the tray or the turntable is required, there is a limit for thinning the disk apparatus body. Hence, recently, there exists a slot-in type disk apparatus in which a disk is directly operated using a lever or the like by a loading motor (e.g., patent document 1).

According to such a slot-in type disk apparatus, however, when a disk is inserted into and ejected from the disk apparatus, it is necessary to lower a spindle motor supported by a traverse base, and to provide a given clearance for insertion. Therefore, a distance for vertically moving the traverse base is required in the thickness direction of the disk apparatus. In recent years with the reduction of personal computer in size, it is also required to reduce the disk apparatus in size and thickness. When the slot-in type disk apparatus is to be reduced in thickness, it is necessary to minimize a distance required for vertically moving the traverse base.

To solve this kind of technical problem, the present inventors have already proposed a structure capable of further downwardly moving the spindle motor with respect to the traverse base (patent document 2).

Patent document 1 Japanese Patent Application Laid-open Application 2002-352498.
Patent document 2 Japanese Patent Application Laid-open Application 2006-73140.

DISCLOSURE OF THE INVENTION

Problem to be Solved by the Invention

In the case of the structure proposed in the patent document 2, however, a cam mechanism for displacing the traverse base between a base body and a lid is generally provided with a clearance so that operation failure is not generated by friction resistance.

If the cam mechanism is provided with a clearance in this manner, the traverse can reliably be displaced, but if a disk whose barycenter is largely deviated is rotated at high speed, fine vibration is generated in the traverse base by the clearance of the cam mechanism, and there is a problem that a disk reading error is generated.

Hence, it is an object of the present invention to prevent fine vibration of the traverse base when a disk is to be played back in the slot-in type disk apparatus.

DISCLOSURE OF THE INVENTION

A slot-in type disk apparatus of a first aspect of the present invention is characterized in that a resilient member abuts against a traverse base at the time of playback of a disk.

According to a second aspect of the invention, in the slot-in type disk apparatus of the first aspect, a cam lever is provided with the resilient member.

According to a a aspect of the invention, in the slot-in type disk apparatus according to the second aspect, a base body and a lid constitute a chassis outer sheath, a front surface of the chassis outer sheath is formed with a disk inserting opening from which a disk is directly inserted, the base body is provided with the traverse base, the traverse base is provided with a spindle motor, a pickup and driving means for moving the pickup, the slot-in type disk apparatus is provided with a cam mechanism which displaces the traverse base between the base body and the lid, the cam mechanism is provided on each of a main slider and a sub-slider, the main slider and the sub-slider are located sideway of the spindle motor, the main slider is connected to the sub-slider through the cam lever, and the cam lever is moved by movement of the main slider and moves the sub-slider, thereby displacing the traverse base.

According to a fourth aspect of the invention, in the slot-in type disk apparatus according to the third aspect, a rotation axis of the cam lever and a rotation axis of the spindle motor are parallel to each other, and the resilient member abuts against a side surface of the traverse base by rotation of the cam lever.

According to a fifth aspect of the invention, in the slot-in type disk apparatus according to the third aspect, when the traverse base is displaced, the resilient member is away from the traverse base.

According to a sixth aspect of the invention, in the slot-in type disk apparatus according to the first aspect, the resilient member is provided on a side opposite from a side where the pickup is operated around the spindle motor.

According to the present invention, it is possible to eliminate the fine vibration of the traverse base even if a disk whose barycenter is largely deviated is rotated at high speed, and to stably read a disk.

BEST MODE FOR CARRYING OUT THE INVENTION

Figure 1:
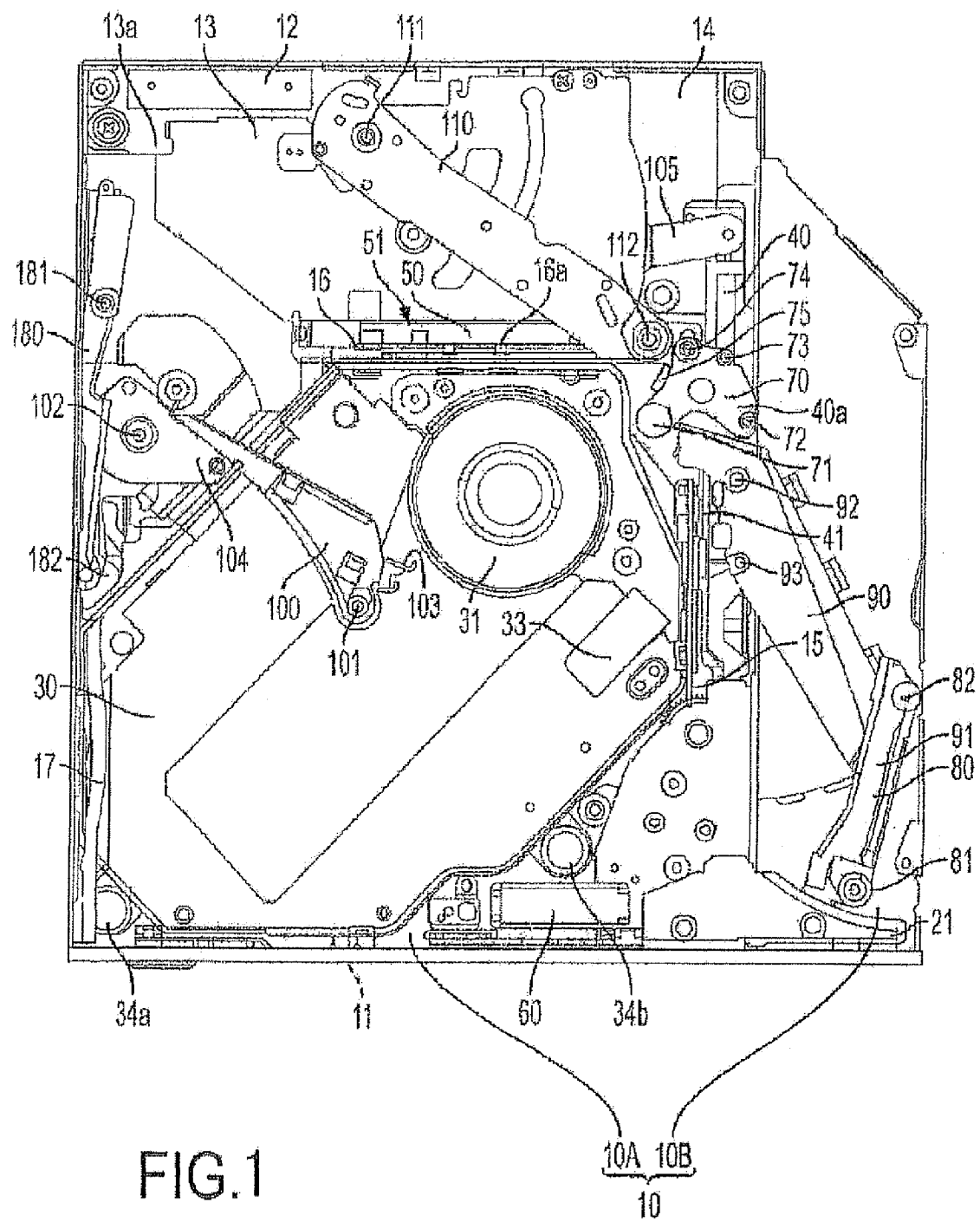
FIG. 1 is a schematic plan view of a base body of a disk apparatus according to an embodiment of the present invention.

In the slot-in type disk apparatus of the first aspect of the invention, the resilient member abuts against the traverse base at the time of playback of a disk. According to this aspect, it is possible to prevent fine vibration at the time of playback of a traverse base, and the displacement of the traverse base is not influenced.

According to the second aspect of the invention, in the slot-in type disk apparatus of the first aspect, the cam lever is provided with the resilient member. According to this aspect, since the motion of the cam lever is utilized, the resilient member can abut against the traverse only at the time of playback of a disk, fine vibration at the time of playback of the traverse base can be prevented, and the displacement of the traverse base is not influenced.

According to the third aspect of the invention, in the slot-in type disk apparatus according to the second aspect, the base body and the lid constitute the chassis outer sheath, the front surface of the chassis outer sheath is formed with the disk inserting opening from which a disk is directly inserted, the base body is provided with the traverse base, the traverse base is provided with the spindle motor, the pickup and the driving means for moving the pickup, the slot-in type disk apparatus is provided with the cam mechanism which displaces the traverse base between the base body and the lid, the cam mechanism is provided on each of the main slider and the sub-slider, the main slider and the sub-slider are located sideway of the spindle motor, the main slider is connected to the sub-slider through the cam lever, the cam lever is moved by movement of the main slider and moves the sub-slider, thereby displacing the traverse base. According to this aspect, since the motion of the cam lever is utilized, the resilient member can abut against the traverse only at the time of playback of a disk, fine vibration at the time of playback of the traverse base can be prevented, and the displacement of the traverse base is not influenced.

According to the fourth aspect of the invention, in the slot-in type disk apparatus according to the third aspect, a rotation axis of the cam lever and a rotation axis of the spindle motor are parallel to each other, and the resilient member abuts against a side surface of the traverse base by rotation of the cam lever. According to this aspect, the resilient member abuts against the side surface of the traverse base and thus, effect with respect to a clearance provided in the cam mechanism is high.

According to the fifth aspect of the invention, in the slot-in type disk apparatus according to the third aspect, when the traverse base is displaced, the resilient member is away from the traverse base. According to this aspect, the displacement of the traverse base is not influenced.

According to the sixth aspect of the invention, in the slot-in type disk apparatus according to the first aspect, the resilient member is provided on a side opposite from a side where the pickup is operated around the spindle motor.

Preferred Embodiment

A disk apparatus according to an embodiment of the present invention will be explained below.

FIG. 1 is a plan view of a base body of the disk apparatus of the embodiment.

The disk apparatus of the embodiment includes a chassis outer sheath comprising a base body and a lid. A bezel is mounted on a front surface of the chassis outer sheath. The disk apparatus of the embodiment is a slot-in type disk apparatus in which a disk is directly inserted from a disk inserting opening formed in the bezel. The base body is formed at its front side with an insertion space corresponding to the disk inserting opening into which the disk is directly inserted.

As shown in FIG. 1, parts which perform a recording function into the disk, a replaying function from the disk and a loading function of the disk are mounted on the base body 10.

The base body 10 is formed with a deep bottom 10A and a shallow bottom 10B, and the shallow bottom 10B forms a wind portion extending from a front surface to a rear surface.

The base body 10 is formed at its front side with a disk inserting opening 11 from which a disk is directly inserted, and a connector 12 is disposed on an end of a rear surface of the base body 10. A traverse base 30 is disposed on the side of the disk inserting opening 11 of the base body 10, and a rear base 13 is disposed on the side of a connector 12 of the base body 10. The traverse base 30 and the rear base 13 are disposed such that they are not superposed on each other. A printed board 14 is provided on the rear base 13 on the side of the base body 10.

The traverse base 30 holds a spindle motor 31, a pickup 32 and driving means 33 which moves the pickup 32. The spindle motor 31 is provided on the one end of the traverse base 30, and the pickup 32 is movably provided from one end to the other end of the traverse base 30. When the pickup 32 is stopped, the pickup 32 is disposed on the other end side of the traverse base 30, i.e., on an outer peripheral side of the base body 10.

In the traverse base 30, the spindle motor 31 is located at a central portion of the base body 10, a reciprocating range of the pickup 32 is located closer to the disk inserting opening 11 than the spindle motor 31, and the reciprocating direction of the pickup 32 is different from an inserting direction of a disk. An angle formed between the reciprocating direction of the pickup 32 and the inserting direction of a disk is 45°.

The traverse base 30 is supported on the base body 10 by a pair of insulators 34A and 34B.

The pair of insulators 34A and 34B are located disposed closer to a stationary position side of the pickup 32 than a position of the spindle motor 31. In this embodiment, the insulator 34A is provided on the one end side in the vicinity of an inner side of one end of the disk inserting opening 11 near its inner side, and the insulator 343 is provided at on the central portion in the vicinity of near the inner side of the disk inserting opening 11. The insulators 34A and 34B include damper mechanisms made of elastic resilient material. The traverse base 30 brings the spindle motor 31 closer to and away from the base body 10 around the insulators 34A and 34B as fulcrums.

A main slider 40 and a sub-slider 50 having cam mechanisms will be explained below. Each of the main slider 40 and the sub-slider 50 has the cam mechanism which displaces the traverse base 30. The main slider 40 and the sub-slider 50 are disposed on the side of the spindle motor 31. The main slider 40 is disposed such that its one end is disposed on the side of a front surface of the base body 10 and the other end is disposed on the side of a rear surface of the base body 10. The sub-slider 50 is disposed such that it intersects with the main slider 40 at right angles between the traverse base 30 and the rear base 13.

The cam mechanism which displaces the traverse base 30 comprises a first cam mechanism 41 and a second cam mechanism 51. The first cam mechanism 41 is provided on a surface of the main slider 40 on the side of the spindle motor 31 and the second cam mechanism 51 is provided on a surface of the sub-slider 50 on the side of the spindle motor 31.

A base member 15 is provided between the main slider 40 and the traverse base 30, and a base member 16 is provided between the sub-slider 50 and the traverse base 30. Here, the base member 15 and the base member 16 are fixed to the base body 10, a position of a cam pin of the traverse base 30 is restricted by a vertical groove formed in the base member 15, and a position of the cam pin of the traverse base 30 is restricted by a vertical groove 16a formed in the base member 16.

The base member 16 and the sub-slider 50 are connected to each other through a third cam mechanism (not shown). The third cam mechanism has a function for moving the sub-slider 50 in a direction away from the base body 10 when the traverse base 30 is moved in a direction away from the base body 10.

A loading motor 60 is disposed on the side of one end of the main slider 40. A drive shaft of the loading motor 60 and the one end of the main slider 40 are connected to each other through a gear mechanism.

By driving the loading motor 60, the main slider 40 can slide in a longitudinal direction. The main slider 40 is connected to the sub-slider 50 through a cam lever 70.

The cam lever 70 includes a turning fulcrum 71, pins 72, 73 and 74. The pins 72 and 73 engage a cam groove formed in an upper surface of the main slider 40, the pin 74 engages a cam groove 40a formed in an upper surface of the sub-slider 50, and the cam lever 70 turns around the turning fulcrum 71.

The cam lever 70 is provided with an resilient member 75 between the turning fulcrum 71 and the pin 74. The resilient member 75 is provided on a side opposite side from a side where the pickup 32 is operated around the spindle motor 31. When the traverse base 30 is displaced by moving the sub-slider 50, the resilient member 75 is away from the traverse base 30.

The above-explained connector 12, traverse base 30, rear base 13, printed board 14, insulators 34A and 34B, main slider 40, sub-slider 50 and loading motor 60 are provided on the deep bottom 10A of the base body 10. A disk inserting space is formed between a lid and these members.

Next, a guide member which supports a disk when the disk is inserted, and a lever member which is operated when a disk is inserted wilt be explained.

Figure 2:
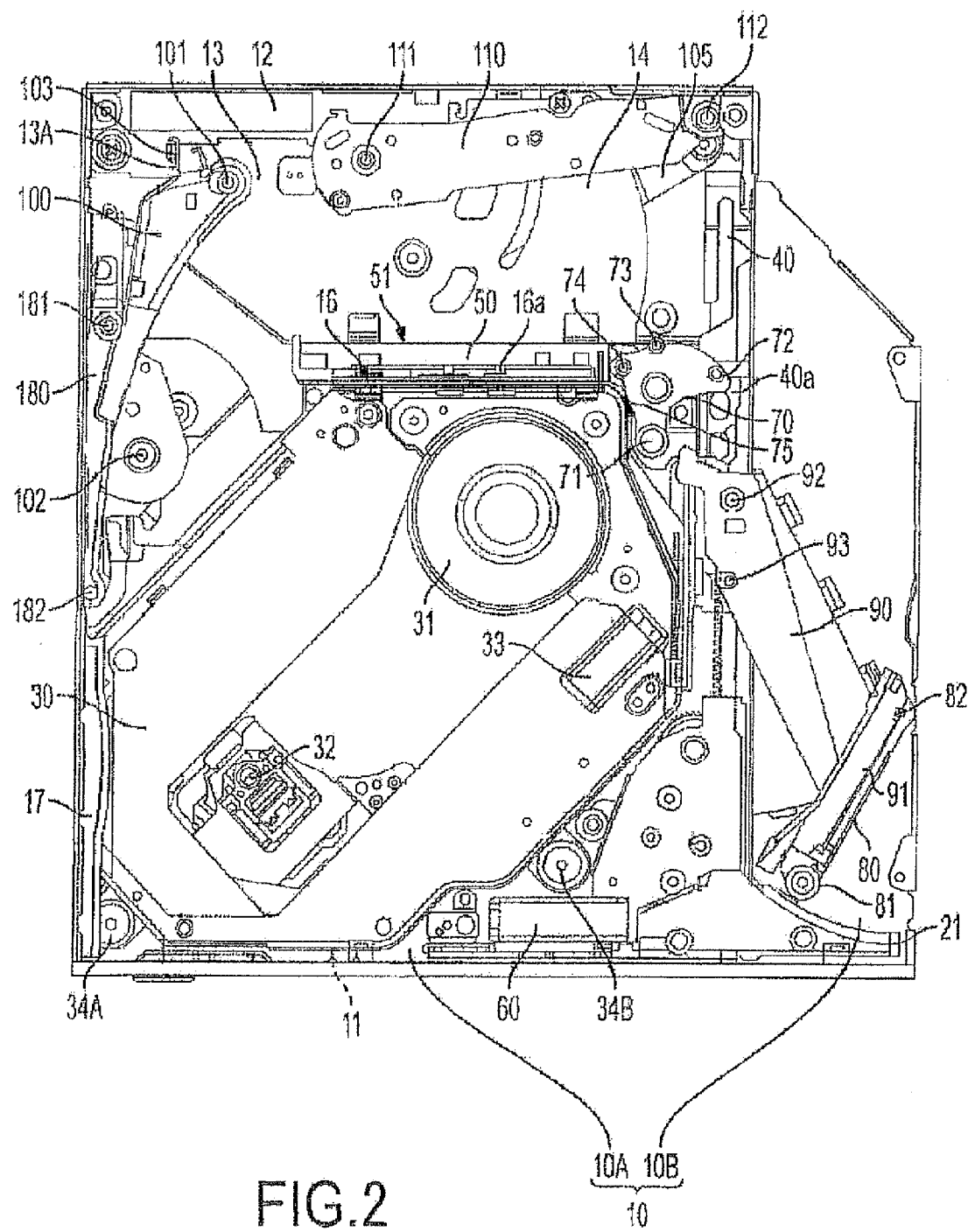
FIG. 2 is a plan view showing a state where the disk apparatus holds a disk.

FIG. 2 is a plan view of the apparatus showing a state where a disk is held.

A first disk guide 17 having a predetermined length is provided on one side of the deep bottom 10A near the disk inserting opening 11. The first disk guide 17 has a U-shaped cross section as viewed from a disk-inserting side. The disk is supported by the groove.

A pull-in lever 80 is provided on the shallow bottom 10B on the side of the disk inserting opening 11. A movable side end of the pull-in lever 80 includes a second disk guide 81. The second disk guide 8S comprises a cylindrical roller, and the second disk guide 81 is turnably provided on a movable-side end of the pull-in lever 80. A groove is formed in an outer periphery of the roller of the second disk guide 81, and a disk is supported in the groove.

The pull-in lever 80 is disposed such that its movable-side end is operated at a location closer to the disk inserting opening 11 than its stationary-side end, and the pull-in lever 80 is provided at its stationary-side end with a turning fulcrum 82.

The pull-in lever 80 is operated by a sub-lever 90.

The sub-lever 90 is provided at its one end on the movable side with a convex portion 91, and at its other end with a turning fulcrum 92. The convex portion 91 of the sub-lever 90 slides in a long groove of the pulling-in lever 80. The turning fulcrum 92 of the sub-lever 90 is located on the main slider 40. The turning fulcrum 92 is not operated associatively with the main slider 40, and is fixed to the base body 10. A pin 93 is provided on a lower surface of the sub-lever 90 closer to a convex portion 91 than the turning fulcrum 92. The pin 93 slides in a cam groove formed in an upper surface of the main slider 40. Therefore, as the main slider 40 moves, the angle of the sub-lever 90 is changed, and the turning angle of the pull-in lever 80 is changed by changing the angle of the sub-lever 90. That is, the second disk guide 81 of the pull-in lever 80 moves closer to and away from the spindle motor 31 by the operation of the sub-lever 90.

A discharging lever 100 is provided on a side of the base body 10 different from the pull-in lever 80. A guide 101 is provided on a movable-side end of one end of the discharging lever 100, and a turning fulcrum 102 is provided on the other end of the discharging lever 100. An abutting portion 103 is provided on a movable-side end of the discharging lever 100 closer to the rear surface than the guide 101. A resilient body 104 is provided on the discharging lever 100. One end of the resilient body 104 is fixed to the discharging lever 100, and the other end is fixed to the rear base 13. When the abutting portion 103 is pulled toward the rear surface, the abutting portion 103 abuts against the abutting portion 13A of the rear base 13. The discharging lever 100 is pulled out toward the disk inserting opening 11 by a resilient force of the resilient body 104. The discharging lever 100 is operated in association with the main slider 40 through a link arm 105.

A guide lever 180 is provided on a side of the base body 10 on the same side as the discharging lever 100. A rear surface of the guide lever 180 is a turning fulcrum 181, and the guide lever 180 includes a guide 182 on the movable side. The guide lever 180 is biased such that the guide 182 projects toward a disk by the resilient body. The guide lever 180 is operated in association with the main slider 40 through the link arm 105, and the guide 182 moves away from a disk in accordance with motion of the main slider 40.

A restriction lever 110 is provided on a rear surface of the base body 10. An end of the restriction lever 110 on the side of the rear surface is a turning fulcrum 111, and is provided at its movable-side end with a guide 112. The restriction lever 110 is biased such that the guide 112 always projects forward by the resilient body. The restriction lever 110 operates a limit switch at a predetermined position. That is, if a disk is inserted up to the predetermined position, the limit switch is turned OFF to drive the loading motor 60. If the loading motor 60 is driven, the main slider 40 slides.

The base body 10 is provided at its front side with a front guider 21. The front guider 21 is disposed on the side of one end of the disk inserting opening 11 and between the pull-in lever 80 and the disk inserting opening 11. The front guider 21 covers portions of the loading motor 60, the gear mechanism and the main slider 40 and is disposed closer to the lid than these members.

The operation of the cam lever will be explained below.

Figure 3:
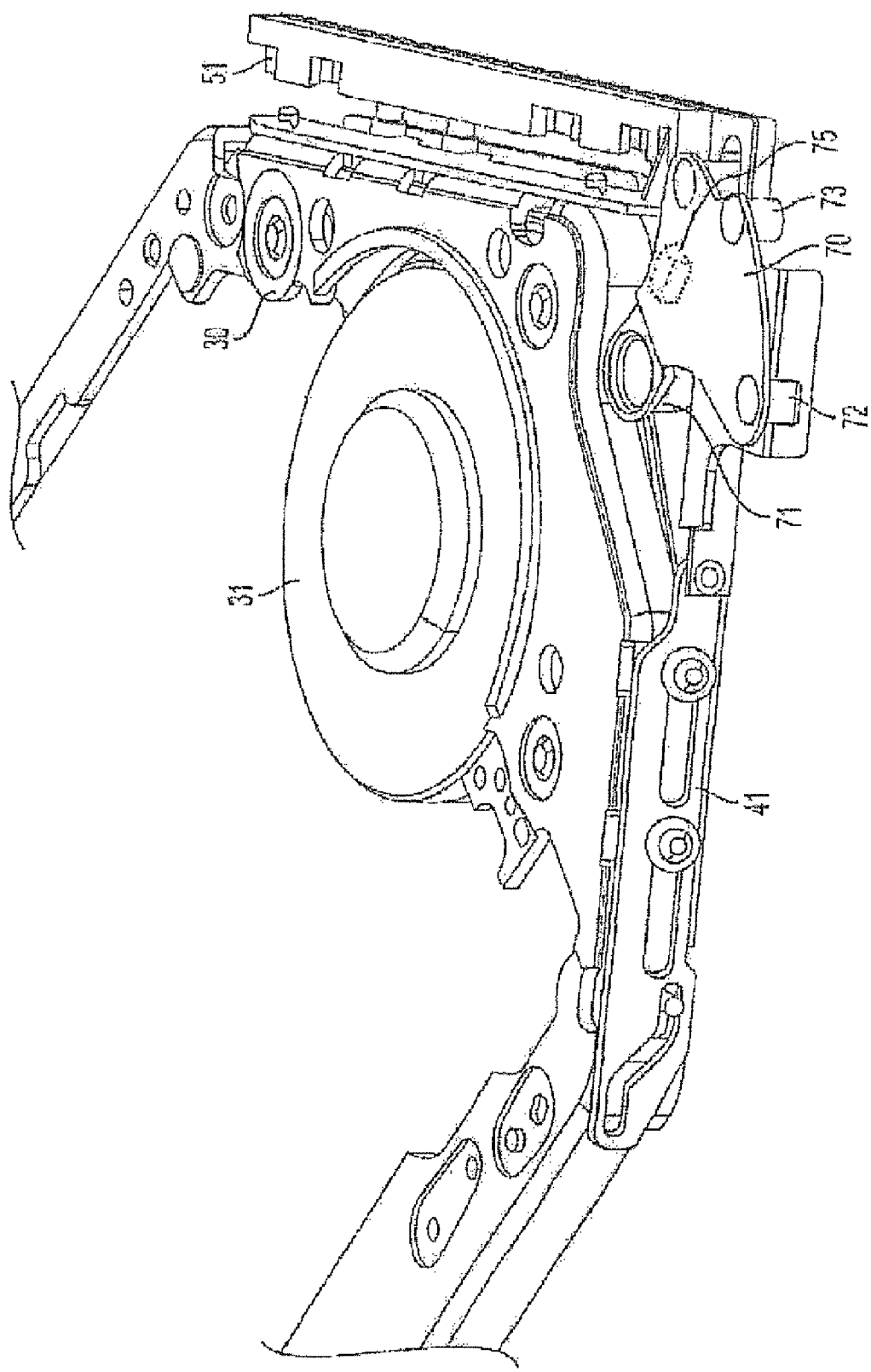
FIG. 3 is a perspective view of an essential portion in FIG. 1.
Figure 4:
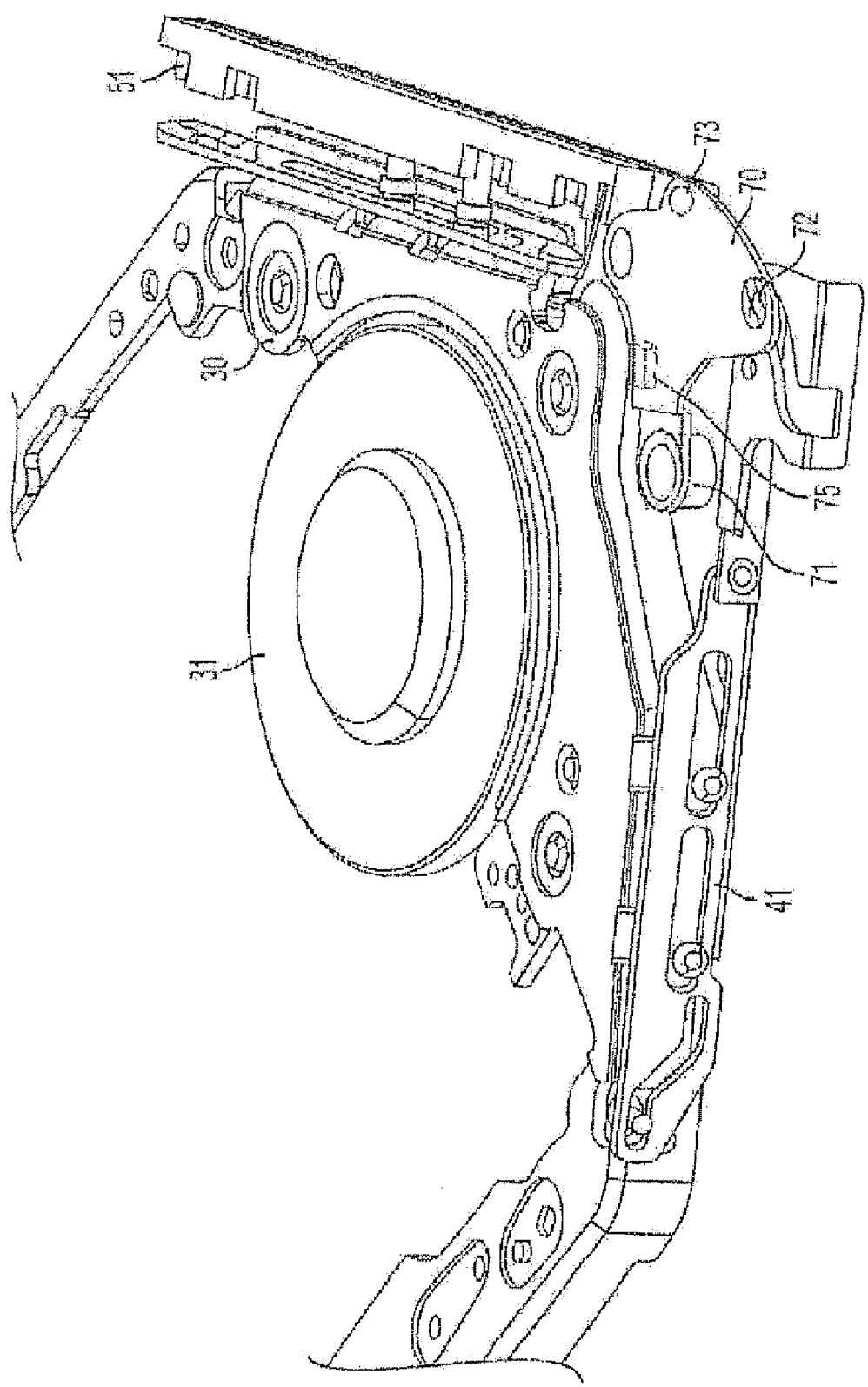
FIG. 4 is a perspective view of an essential portion in FIG. 2.

FIG. 3 is a perspective view of an essential portion of a state shown in FIG. 1. FIG. 4 is a perspective view of an essential portion of a state shown in FIG. 2.

While the pin 73 is in engagement with the cam groove, the cam lever 70 does not turn. FIGS. 1 and 3 show the cam lever 70 in this state. This state is a standby state. This state is kept for a while even after a disk is loaded, and the traverse base 30 is close to the base body 10.

With timing when the center of a disk comes above the spindle motor 31, the pin 73 is disengaged from the cam groove of the main slider 40 and the cam lever 70 starts turning.

The main slider 40 has a groove in which the pin 72 of the cam lever 70 slides. The first cam mechanism 411 moves in the same direction as that of the main slider 40 by the operation of the cam lever 70. The sub-slider 50 is moved by turning the cam lever 70, and if the sub-slider 50 is moved, the second cam mechanism 51 moves.

That is, by turning the cam lever 70, the first cam mechanism 41 and the second cam mechanism 51 move by predetermined distances, and the traverse base 30 is displaced.

In the state where the traverse base 30 is displaced, the resilient member 75 is separated away from the traverse base 30. When the chucking operation is completed, the turning motion of the cam lever 70 is completed, and when this turning motion of the cam lever 70 is completed or before completed, the resilient member 75 abuts against the traverse base 30 and pushes the traverse base 30 from side.

FIGS. 2 and 4 show the state where the resilient member 75 abuts against the traverse base 30.

According to the embodiment, as described above, since the motion of the cam lever 70 is utilized, the resilient member 75 can abut against the traverse base 30 only when replaying a disk, fine vibration at the time of playback of the traverse base 30 can be prevented, and the displacing motion of the traverse base 30 is not influenced.

The present invention can be utilized for a disk apparatus for recording or replaying into or from a disk-like recording medium such as a CD and a DVD, which is used as a domestic video apparatus or a peripheral device for a computer, which is required to be thin, in which even if the movement of a traverse base for reliably loading a disk on a spindle motor is minimized, it is possible to secure a space in which the disk is reliably automatically attached.

The invention claimed is:

1. A slot-in type disk apparatus comprising:
    a base body that constitutes a chassis outer sheath with a lid, a front surface of said chassis outer sheath being formed with a disk inserting opening from which a disk is directly inserted;
    a traverse base provided with said base body, said traverse base being provided with a spindle motor, a pickup and a driver for moving said pickup; and
    a cam mechanism which displaces said traverse base between said base body and said lid, said cam mechanism being provided on each of a main slider and a sub-slider, said main slider and said sub-slider being located sideway of said spindle motor, said main slider being connected to said sub-slider through a cam lever, said cam lever being provided with a resilient member,
    wherein said cam lever is moved by movement of said main slider, and moves said sub-slider, thereby displacing said traverse base, and said resilient member abuts against said traverse base at a time of playback of said disk.

2. The slot-in type disk apparatus according to claim 1, wherein a rotation axis of said cam lever and a rotation axis of said spindle motor are parallel to each other, and said resilient member abuts against a side surface of said traverse base by rotation of said cam lever.

3. The slot-in type disk apparatus according to claim 1, wherein when said traverse base is displaced from a position of playback position of said disk, said resilient member is away from said traverse base.

4. A slot-in type disk apparatus, comprising:
    a base body that constitutes a chassis outer sheath with a lid;
    a traverse base provided with said base body; and
    a cam mechanism which displaces said traverse base between said base body and said lid, said cam mechanism being provided on each of a main slider and a sub-slider, said main slider being connected to said sub-slider through a cam lever, said cam lever being provided with a resilient member,
    wherein said cam lever is moved by movement of said main slider, and moves said sub-slider, thereby displacing said traverse base, and said resilient member abuts against said traverse base at a time of playback of said disk.

* * * * *